United States Patent
O'Neil et al.

(10) Patent No.: US 10,200,505 B2
(45) Date of Patent: *Feb. 5, 2019

(54) DISTRIBUTION SCHEME FOR SUBSCRIBER-CREATED CONTENT, WHEREIN THE SUBSCRIBER-CREATED CONTENT IS STORED WHILE WAITING FOR A DEVICE OF A RECIPIENT IN A COMMUNITY TO CONNECT AND DELIVERED WHEN THE DEVICE OF THE RECIPIENT IS DETECTED

(71) Applicant: AT&T Intellectual Property I, L.P., Atlanta, GA (US)

(72) Inventors: Douglas R. O'Neil, Marietta, GA (US); John Alson Hicks, III, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 808 days.

This patent is subject to a terminal disclaimer.

(21) Appl. No.: 14/629,055

(22) Filed: Feb. 23, 2015

(65) Prior Publication Data

US 2015/0172420 A1    Jun. 18, 2015

Related U.S. Application Data

(63) Continuation of application No. 11/469,321, filed on Aug. 31, 2006, now Pat. No. 8,965,999.
(Continued)

(51) Int. Cl.
*H04L 29/06* (2006.01)
*G06Q 20/12* (2012.01)
(Continued)

(52) U.S. Cl.
CPC .......... *H04L 67/42* (2013.01); *G06Q 10/107* (2013.01); *G06Q 20/123* (2013.01); *G06Q 30/04* (2013.01);
(Continued)

(58) Field of Classification Search
CPC .... G06Q 10/107; G06Q 30/04; H04L 12/587; H04L 12/5855; H04L 12/54; H04L 67/24;
(Continued)

(56) References Cited

U.S. PATENT DOCUMENTS 5,305,195 A   4/1994   Murphy
5,572,643 A   11/1996  Judson
(Continued)

FOREIGN PATENT DOCUMENTS

EP   1 892 926 A1   2/2008

*Primary Examiner* — Daniel C. Murray

(57) ABSTRACT

Distribution schemes for subscriber-created content are described. Subscribers create and upload content for distribution to communities of recipients. The recipients join the communities in response to invitations from the subscribers. When connections to devices associated with the recipients are detected, any content due for delivery to the recipients is distributed. Systems supporting these distribution schemes may include content distribution modules that receive the content from the subscribers, and that provide corresponding content notifications. Content storage modules store the uploaded subscriber content. In response to the content notifications, notification modules notify the recipients that the content is available. Presence modules detect the connections to the devices, and provide corresponding device notifications. In response to the device notifications, device management modules provide recipient notifications, which associate recipients with the detected devices. Content distribution modules receive the recipient notifications and distribute the content to the recipients.

20 Claims, 8 Drawing Sheets

Related U.S. Application Data

(60) Provisional application No. 60/745,252, filed on Apr. 20, 2006.

(51) Int. Cl.
    *G06Q 30/04*           (2012.01)
    *H04M 15/00*          (2006.01)
    *H04W 4/24*            (2018.01)
    *G06Q 10/10*          (2012.01)
    *H04L 12/54*          (2013.01)
    *H04L 29/08*          (2006.01)
    *H04N 21/218*         (2011.01)
    *H04N 21/23*          (2011.01)
    *H04N 21/4402*       (2011.01)
    *H04N 21/485*         (2011.01)
    *H04L 12/58*          (2006.01)

(52) U.S. Cl.
    CPC .............. *H04L 12/54* (2013.01); *H04L 51/14* (2013.01); *H04L 67/1046* (2013.01); *H04L 67/1063* (2013.01); *H04L 67/24* (2013.01); *H04L 67/26* (2013.01); *H04M 15/00* (2013.01); *H04M 15/68* (2013.01); *H04N 21/2181* (2013.01); *H04N 21/23* (2013.01); *H04N 21/440263* (2013.01); *H04N 21/485* (2013.01); *H04W 4/24* (2013.01); *H04L 51/24* (2013.01)

(58) Field of Classification Search
    CPC . H04L 67/1046; H04L 67/1063; H04L 67/26; H04N 21/2181; H04N 21/23; H04N 21/440263; H04N 21/485; H04W 4/24
    USPC .......................................................... 709/204
    See application file for complete search history.

(56) References Cited

U.S. PATENT DOCUMENTS

| | | | |
|---|---|---|---|
| 5,604,542 | A | 2/1997 | Dedrick |
| 5,608,874 | A | 3/1997 | Ogawa et al. |
| 5,675,507 | A | 10/1997 | Bobo, II |
| 5,710,883 | A | 1/1998 | Hong et al. |
| 5,737,619 | A | 4/1998 | Judson |
| 5,740,549 | A | 4/1998 | Reilly et al. |
| 5,794,039 | A | 8/1998 | Guck |
| 5,802,314 | A | 9/1998 | Tullis et al. |
| 5,848,415 | A | 12/1998 | Guck |
| 5,864,870 | A | 1/1999 | Guck |
| 5,911,776 | A | 6/1999 | Guck |
| 5,913,040 | A | 6/1999 | Rakavy et al. |
| 5,915,001 | A | 6/1999 | Uppaluru |
| 5,945,989 | A | 8/1999 | Freishtat et al. |
| 5,948,069 | A | 9/1999 | Kitai et al. |
| 6,029,200 | A | 2/2000 | Beckerman et al. |
| 6,044,372 | A | 3/2000 | Rothfus et al. |
| 6,086,702 | A | 7/2000 | Plantz et al. |
| 6,108,703 | A * | 8/2000 | Leighton ............. G06F 17/3089 707/E17.119 |
| 6,202,086 | B1 | 3/2001 | Maruyama et al. |
| 6,230,205 | B1 * | 5/2001 | Garrity ................... H04L 29/06 709/204 |
| 6,345,279 | B1 | 2/2002 | Li et al. |
| 6,463,462 | B1 * | 10/2002 | Smith .................. G06Q 10/107 709/206 |
| 6,526,335 | B1 | 2/2003 | Treyz et al. |
| 6,553,413 | B1 * | 4/2003 | Leighton ............. G06F 17/3089 707/E17.119 |
| 6,611,870 | B1 | 8/2003 | Asano et al. |
| 6,741,853 | B1 | 5/2004 | Jiang et al. |
| 6,782,414 | B1 | 8/2004 | Xue et al. |
| 6,789,108 | B1 | 9/2004 | McMillan |
| 6,985,920 | B2 | 11/2005 | Pedersen |
| 6,985,934 | B1 | 1/2006 | Armstrong et al. |
| 7,103,645 | B2 * | 9/2006 | Leighton ............. G06F 17/3089 707/E17.119 |
| 7,139,801 | B2 | 11/2006 | Smith et al. |
| 7,287,056 | B2 | 10/2007 | Loveland et al. |
| 7,299,050 | B2 | 11/2007 | Delaney et al. |
| 7,315,526 | B2 | 1/2008 | Zhang et al. |
| 7,340,769 | B2 * | 3/2008 | Baugher .................. G06F 21/10 713/151 |
| 7,353,256 | B2 | 4/2008 | Delaney et al. |
| 7,421,476 | B2 | 9/2008 | Weaver |
| 7,421,482 | B2 | 9/2008 | Armstrong et al. |
| 7,426,537 | B2 | 9/2008 | Lee et al. |
| 7,441,047 | B2 | 10/2008 | Gibbs et al. |
| 7,487,157 | B2 | 2/2009 | Appelstal |
| 7,533,187 | B1 | 5/2009 | Tanumihardja et al. |
| 7,588,014 | B2 | 7/2009 | Brown et al. |
| 7,574,515 | B2 | 8/2009 | Fontijn et al. |
| 7,653,753 | B2 | 1/2010 | Chen et al. |
| 7,693,959 | B2 * | 4/2010 | Leighton ............. G06F 17/3089 709/217 |
| 7,747,708 | B2 | 6/2010 | Armstrong et al. |
| 7,783,767 | B2 | 8/2010 | Collazo |
| 7,827,314 | B2 | 11/2010 | Gibbs et al. |
| 8,001,187 | B2 * | 8/2011 | Stochosky .......... H04L 12/1813 709/205 |
| 8,005,345 | B2 | 8/2011 | Haot et al. |
| 8,060,625 | B2 | 11/2011 | Armstrong et al. |
| 8,064,446 | B2 | 11/2011 | Ramakrishnan et al. |
| 8,073,961 | B2 * | 12/2011 | Leighton ............. G06F 17/3089 709/217 |
| 8,099,343 | B1 | 1/2012 | O'Neil et al. |
| 8,122,128 | B2 * | 2/2012 | Burke, II ................ H04L 63/10 709/225 |
| 8,271,617 | B2 * | 9/2012 | Thomson ............ G06F 17/3089 709/217 |
| 8,275,905 | B2 | 9/2012 | Xiao et al. |
| 8,295,203 | B2 | 10/2012 | Ramakrishnan et al. |
| 8,417,820 | B2 | 4/2013 | Armstrong et al. |
| 8,429,169 | B2 | 4/2013 | Koopmans et al. |
| 8,553,602 | B2 | 10/2013 | Hargrave et al. |
| 8,577,997 | B2 * | 11/2013 | Thomson ............ G06F 17/3089 709/217 |
| 8,782,281 | B2 | 7/2014 | Mall et al. |
| 8,799,468 | B2 * | 8/2014 | Burke, II ................ H04L 63/10 709/225 |
| 8,843,551 | B2 * | 9/2014 | Hayashi ................ H04L 67/306 709/204 |
| 8,843,560 | B2 * | 9/2014 | Hayashi ................ H04L 67/306 709/205 |
| 9,465,925 | B2 * | 10/2016 | Burke, II ................ H04L 63/10 |
| 9,641,482 | B2 * | 5/2017 | Leighton ............. H04L 61/2514 |
| 2002/0116444 | A1 * | 8/2002 | Chaudhri ................ H04L 67/42 709/201 |
| 2002/0129364 | A1 | 9/2002 | Smith et al. |
| 2002/0138601 | A1 * | 9/2002 | Piponius .................. H04L 29/06 709/223 |
| 2002/0144154 | A1 | 10/2002 | Tomkow |
| 2003/0008661 | A1 | 1/2003 | Joyce et al. |
| 2003/0032409 | A1 | 2/2003 | Hutcheson et al. |
| 2003/0050975 | A1 | 3/2003 | Blaylock |
| 2003/0072259 | A1 | 4/2003 | Mor |
| 2003/0137401 | A1 | 7/2003 | Sauer |
| 2003/0172120 | A1 | 9/2003 | Tomkow et al. |
| 2003/0191822 | A1 * | 10/2003 | Leighton ............. G06F 17/3089 709/219 |
| 2003/0225834 | A1 | 12/2003 | Lee et al. |
| 2003/0229549 | A1 | 12/2003 | Wolinsky et al. |
| 2003/0236917 | A1 | 12/2003 | Gibbs et al. |
| 2004/0039781 | A1 * | 2/2004 | LaVallee ................ H04L 67/104 709/205 |
| 2004/0093419 | A1 * | 5/2004 | Weihl ..................... H04L 63/06 709/229 |
| 2004/0093558 | A1 | 5/2004 | Weaver |
| 2004/0196842 | A1 | 10/2004 | Dobbins |
| 2004/0199604 | A1 | 10/2004 | Dobbins et al. |
| 2004/0199667 | A1 | 10/2004 | Dobbins |
| 2004/0230657 | A1 | 11/2004 | Tomkow |

(56) References Cited

U.S. PATENT DOCUMENTS

| | | |
|---|---|---|
| 2005/0004985 A1* | 1/2005 | Stochosky .......... H04L 12/1813 709/205 |
| 2005/0004995 A1* | 1/2005 | Stochosky .......... H04L 12/1813 709/219 |
| 2005/0074100 A1 | 4/2005 | Lederman |
| 2005/0114412 A1 | 5/2005 | Gerhard |
| 2005/0125528 A1* | 6/2005 | Burke, II .............. H04L 63/10 709/223 |
| 2005/0171832 A1 | 8/2005 | Hull et al. |
| 2005/0198161 A1 | 9/2005 | Rooke et al. |
| 2005/0256941 A1 | 11/2005 | Armstrong et al. |
| 2006/0075108 A1 | 4/2006 | Sylvain |
| 2006/0140181 A1 | 6/2006 | Trumper et al. |
| 2006/0143307 A1 | 6/2006 | Codignotto |
| 2006/0156392 A1* | 7/2006 | Baugher ................ G06F 21/10 726/5 |
| 2006/0271687 A1 | 11/2006 | Alston et al. |
| 2007/0005689 A1* | 1/2007 | Leighton ............ G06F 17/3089 709/203 |
| 2007/0005797 A1 | 1/2007 | Fontijn et al. |
| 2007/0088817 A1 | 4/2007 | Li |
| 2007/0113179 A1 | 5/2007 | Gibbs et al. |
| 2007/0124416 A1 | 5/2007 | Casey et al. |
| 2007/0124785 A1 | 5/2007 | Marsico |
| 2007/0204064 A1 | 8/2007 | Mail et al. |
| 2007/0211872 A1 | 9/2007 | Cai et al. |
| 2007/0255807 A1* | 11/2007 | Hayashi ................ H04L 67/306 709/219 |
| 2008/0069061 A1 | 3/2008 | Baken et al. |
| 2008/0104205 A1 | 5/2008 | Armstrong et al. |
| 2008/0120344 A1 | 5/2008 | Armstrong et al. |
| 2008/0140849 A1 | 6/2008 | Collazo |
| 2008/0141321 A1 | 6/2008 | Kubat et al. |
| 2008/0141328 A1 | 6/2008 | Weintraub et al. |
| 2008/0146342 A1 | 6/2008 | Harvey et al. |
| 2008/0151130 A1 | 6/2008 | Van Gassel et al. |
| 2008/0177713 A1 | 7/2008 | Armstrong et al. |
| 2008/0177893 A1 | 7/2008 | Bowra et al. |
| 2008/0183584 A1 | 7/2008 | Armstrong et al. |
| 2008/0205435 A1* | 8/2008 | Nahumi ............ H04N 7/17318 370/463 |
| 2008/0228925 A1 | 9/2008 | Armstrong et al. |
| 2008/0256170 A1* | 10/2008 | Hayashi ................ H04L 67/306 709/201 |
| 2008/0256263 A1 | 10/2008 | Nerst et al. |
| 2008/0256647 A1 | 10/2008 | Kim et al. |
| 2008/0283221 A1 | 10/2008 | Xiao et al. |
| 2008/0298321 A1 | 12/2008 | Lee et al. |
| 2008/0307090 A1 | 12/2008 | Pearson |
| 2009/0030757 A1 | 1/2009 | Admon et al. |
| 2009/0046598 A1 | 2/2009 | Krishnaswamy et al. |
| 2009/0052448 A1 | 2/2009 | Ramakrishnan et al. |
| 2009/0052449 A1 | 2/2009 | Ramakrishnan et al. |
| 2009/0158325 A1 | 6/2009 | Johnson |
| 2009/0169021 A1 | 7/2009 | Ushiyama |
| 2009/0249401 A1 | 10/2009 | Squedin et al. |
| 2009/0285123 A1 | 11/2009 | Huang et al. |
| 2009/0310509 A1 | 12/2009 | Kumai et al. |
| 2010/0004993 A1 | 1/2010 | Troy et al. |
| 2010/0198916 A1* | 8/2010 | Leighton ............ G06F 17/3089 709/203 |
| 2010/0199327 A1* | 8/2010 | Keum ................ H04N 7/17318 726/3 |
| 2010/0250733 A1 | 9/2010 | Turanyi et al. |
| 2011/0149991 A1 | 6/2011 | Jiang |
| 2012/0033582 A1 | 2/2012 | Ramakrishnan et al. |
| 2012/0143997 A1* | 6/2012 | Leighton ............ G06F 17/3089 709/219 |
| 2012/0210341 A1* | 8/2012 | Burke, II .............. H04L 63/10 725/23 |
| 2012/0221662 A1 | 8/2012 | Yasukawa et al. |
| 2013/0013748 A1* | 1/2013 | Leighton ............ G06F 17/3089 709/219 |
| 2013/0044642 A1 | 2/2013 | Ramakrishnan et al. |
| 2013/0094666 A1 | 4/2013 | Haff et al. |
| 2013/0179535 A1 | 7/2013 | Baalu et al. |
| 2013/0212189 A1 | 8/2013 | Velissarakos |
| 2013/0227003 A1 | 8/2013 | Armstrong et al. |
| 2013/0276085 A1 | 10/2013 | Sharaga et al. |
| 2014/0040959 A1 | 2/2014 | Oyman |
| 2014/0059248 A1* | 2/2014 | Leighton ............ G06F 17/3089 709/245 |
| 2014/0092006 A1 | 4/2014 | Boelter et al. |
| 2014/0269671 A1 | 9/2014 | Kalkunte |
| 2015/0081427 A1* | 3/2015 | Burke, II .............. H04L 63/10 705/14.49 |
| 2017/0155654 A1* | 6/2017 | Burke, II .............. H04L 63/10 |
| 2017/0237705 A1* | 8/2017 | Leighton ............ H04L 61/2007 709/226 |

* cited by examiner

DISTRIBUTION SCHEME FOR SUBSCRIBER-CREATED CONTENT, WHEREIN THE SUBSCRIBER-CREATED CONTENT IS STORED WHILE WAITING FOR A DEVICE OF A RECIPIENT IN A COMMUNITY TO CONNECT AND DELIVERED WHEN THE DEVICE OF THE RECIPIENT IS DETECTED

CROSS-REFERENCE TO RELATED APPLICATIONS

This application is a continuation of U.S. patent application Ser. No. 11/469,321, filed Aug. 31, 2006, now U.S. Pat. No. 8,965,999, which claims the benefit of U.S. Provisional Patent Application No. 60/745,252, filed Apr. 20, 2006, all of which are herein incorporated by reference in their entirety.

BACKGROUND

Various schemes for distributing content are known. For example, a photographer may capture digital images or video with a camera, and manually distribute these images or video to one or more recipients. Examples of such manual distribution include recording the images or video onto tangible media, and delivering the tangible media to the recipients. Also, the images or video may be e-mailed to the recipients. In other instances, the images or video may be manually uploaded to a website. In turn, the recipients may visit the website, and manually download the images or video.

While these manual techniques are somewhat successful in delivering content to recipients, opportunities for further improvement nevertheless exist. For example, inexperienced computer users may not be comfortable with the manual steps involved visiting a website and downloading the images or video mentioned in the previous example. Other users may simply not want to be bothered with this sequence of manual steps.

SUMMARY

Distribution schemes for subscriber-created content are described. Subscribers create and upload content for distribution to communities of recipients. The recipients join the communities in response to invitations from the subscribers. When connections to devices associated with the recipients are detected, any content due for delivery to the recipients is distributed. Systems supporting these distribution schemes may include content distribution modules that receive the content from the subscribers, and that provide corresponding content notifications. Content storage modules store the uploaded subscriber content. In response to the content notifications, notification modules notify the recipients that the content is available. Presence modules detect the connections to the devices, and provide corresponding device notifications. In response to the device notifications, device management modules provide recipient notifications, which associate recipients with the detected devices. Content distribution modules receive the recipient notifications and distribute the content to the recipients.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
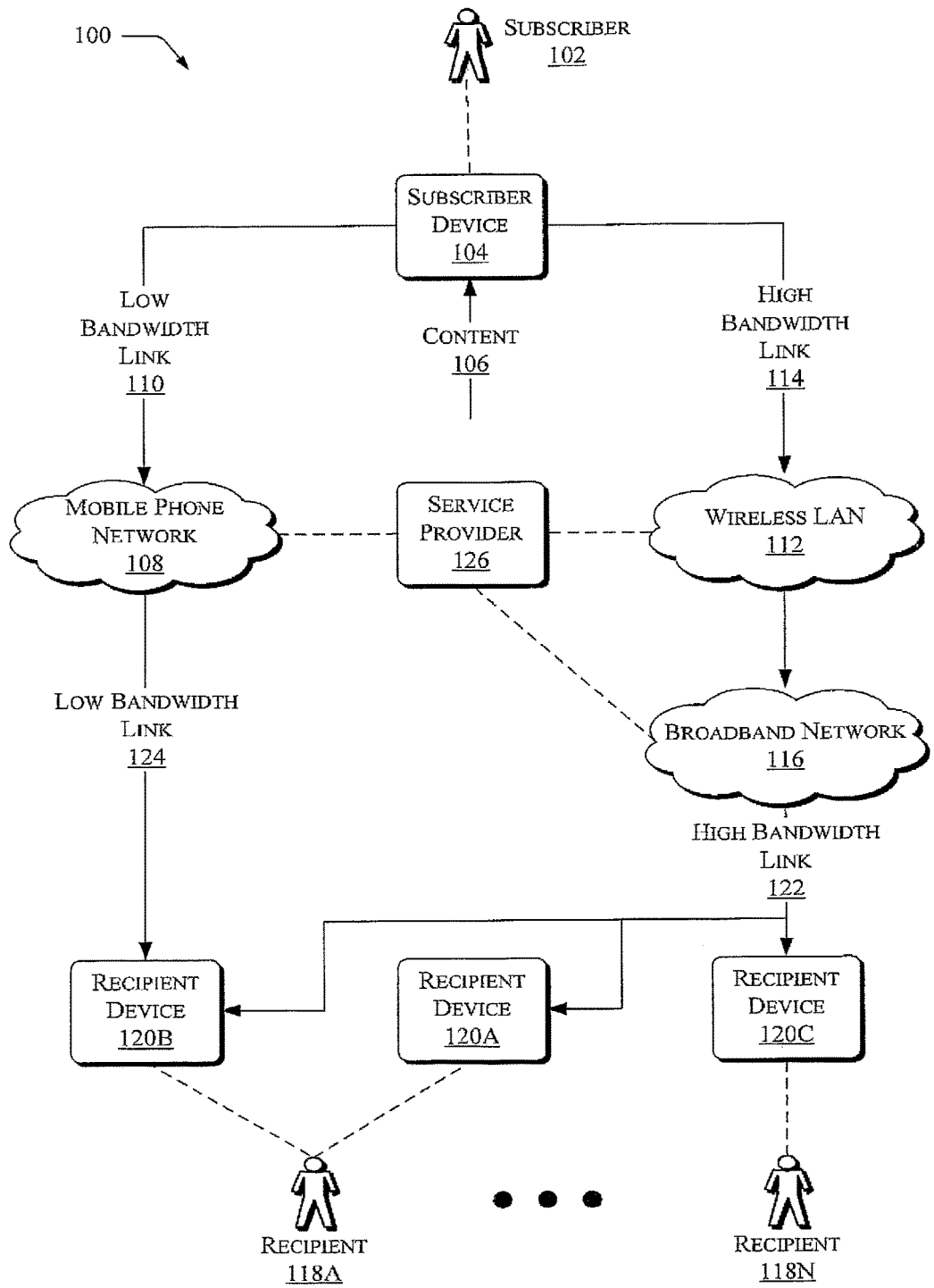
FIG. 1 is a block diagram of an overall environment in which a distribution scheme for subscriber-created content may operate.

FIG. 1 illustrates an overall environment 100 related to providing a distribution scheme for subscriber-created content. A user, illustrated in FIG. 1 as a "subscriber" 102 may use a communication device, illustrated in FIG. 1 as a "subscriber device" 104 to capture content 106. It should be appreciated that the term "subscriber" includes not only a user with a subscription to a communication service for a communication device but also an authorized user of the communication service for the communication device. Moreover, although one subscriber and one subscriber device are shown in FIG. 1 for simplicity of illustration, it should be appreciated that any number of subscribers and subscriber devices may be used. Examples of the content 106 may include video, audio, images, photographs, combinations of the foregoing, or the like. As such, the content 106 may include visible and/or audible components.

The device 104 may include any device suitable for capturing, storing, and transmitting the content 106. Thus, the device 104 may include mobile telephones equipped with motion or still cameras, microphones, or other components suitable for capturing the content 106.

The device 104 may also be configured to communicate with a mobile phone network 108 via a communication link 110. For example, the mobile phone network 108 may be one or more cellular wireless telephone networks that may be implemented using any suitable telecommunications technology. Examples of such technology are GSM, HSDPA, CDMA, WCDMA, and TDMA. Using the communication link 110, the device 104 may enable the subscriber 102 to access voice communications services, for example. According to one embodiment, the mobile phone network 108 operates on signals having frequencies falling within the radio-frequency (RF) range. Thus, the communication link 110 may operate at frequencies ranging from approximately 450 MHz to approximately 1900 MHz.

Additionally, the device 104 may be configured to communicate with a wireless local area network (LAN) 112 via a communication link 114. The wireless LAN 112 may, for example, comply with the specifications of IEEE 802.11. As such, the communication link 114 may be capable of operating at frequencies such as approximately 5 GHz. Thus, the communication link 114 may be characterized as a high-bandwidth link, relative to the communication link 110.

The wireless LAN 112 and the related communication link 114 may be implemented in connection with, for example, one or more wireless routers or other components. In possible implementations, the wireless LAN may be deployed in home, office, or other environments. Also, the wireless LAN may communicate with a broadband network 116, such as the Internet. For example, the subscriber 102 may connect to the broadband network using a suitable Internet Service Provider (ISP).

As a non-limiting example of how the foregoing components may operate, assume that the subscriber 102 has used the mobile device 104 to record audio and/or video of a child's sporting event. The content 106 would then correspond to this recorded audio and/or video. Having captured the content, the subscriber may wish to provide this content to one or more recipients 118. Two recipients 118A and 118N (collectively, recipients 118) are shown in FIG. 1, but the environment 100 could include any number of recipients 118.

The recipients 118 may be associated with one or more respective recipient devices 120. In the non-limiting example shown in FIG. 1, the devices 120A and 120B are shown associated with the recipient 118A, and the device 120C is shown associated with the recipient 118N.

Turning to the recipient 118A, the device 120A may access the broadband network 116 via a high bandwidth link 122. The high bandwidth link 122 may be, for example, a digital subscriber line (DSL) connection, a cable modem connection, a satellite connection, WiFi connection, WiMax connection, or the like.

The device 120B may access the mobile phone network 108 via a relatively low bandwidth link 124. The device 120B may be, for example, a mobile telephone that is configured to communicate with the mobile phone network 108 via an RF link.

Turning to the recipient 118N, the device 120C may also have access to the broadband network 116 via the high bandwidth link 122. FIG. 1 shows only one high bandwidth link 122 for convenience only. However, it is understood that the recipients 118A and 118N may access the broadband network 116 via respective or different high bandwidth links 122. For example, the recipients 118A and 118N may have respective accounts with a network provider under which they each access the broadband network 116.

In the example as shown in FIG. 1, the devices 120A and 120C may be respective personal computers (either desktop, laptop, notebook, or handheld) that are equipped with network adapters that are suitable for connecting to the broadband network 116 via the respective high bandwidth links 122. The devices 120A and 102C may also take the form of digital video recorders (DVRs), digital audio recorders, or other similar devices that may store streams of content.

Having described the above infrastructure, the discussion now returns to the example introduced above, in which the subscriber 102 has captured video of a child's sporting event, and wishes to distribute this content 106 to the recipients 118. The subscriber 102 could, for example, attempt to transmit the content relatively soon after capturing the content at the venue of the sporting event. More particularly, the subscriber 102 could transmit the content via the low bandwidth links 110 and 124, using the mobile telephone network 108. However, in some instances, this approach may not be attractive for several reasons. First, the mobile telephone network 108 may be suitable for transmitting voice communications in a reasonable amount of time, and may be designed for this general purpose. However, the mobile telephone network 108 may not be as suitable for transmitting multimedia content, such as the video and/or audio content of this example. Thus, transmitting the content 106 over the mobile telephone network 108 may entail a significant delay, and this delay could result in considerable fees or charges.

To avoid the above issues with delay and cost, the operating environment 100 enables the subscriber 102 to use the high bandwidth links 114 and 122, as an alternative to the links 116 and 124, when distributing the content 106. For example, instead of transmitting or distributing the content 106 at the venue of the sporting event, the subscriber 102 could store the content on the device 104. Later, after returning home, the subscriber 102 could upload the content 106 using the wireless LAN 112 and the high bandwidth link 114, assuming the subscriber's home is suitably equipped with such components. In this manner, the subscriber 102 may avoid the delay and cost associated with distributing the content 106 using the mobile telephone network 108.

Once the subscriber 102 has uploaded the content 106, the content may be distributed through the broadband network 116 to the recipients 118. More particularly, the recipients may receive the content via respective high bandwidth links 122, and may view the content on the recipient devices 120.

As shown in FIG. 1, a service provider 126 may have relationships with the subscriber 102 and the recipients 118. More specifically, the service provider 126 may associate the subscriber 102 with one or more of the recipients 118, such that the subscriber 102 and associated recipients 118 are organized into a community. Within such a community, the subscriber 102 may readily distribute subscriber-created content 106 to any recipients 118 in the subscriber's community. Additionally, it is noted that the subscriber 102 may form more than one community. For example, the subscriber 102 may form one community of family members and/or friends, and may form at least another community of business associates, co-workers, professional colleagues, or the like. Finally, the recipients 118 may themselves be subscribers, and may form other communities, some of which may contain the subscriber 102.

The community may be viewed as a "closed" group of recipients who have been invited specifically by the subscriber 102 to join the subscriber's community, and who have accepted this invitation. On at least this basis, the community as described herein is distinguished from "open" distribution models such as peer-to-peer networks, uploads to publicly-accessible Internet sites, or the like.

In some instances, a given subscriber may join his or her own community as a recipient. The subscriber may choose to do so in order to capture content with a first device, and afterwards have content delivered to a different device. For example, returning to the child's sporting event example from above, a parent (as a subscriber) may capture and upload the audio/video content of the child's event. If the parent is also a recipient or member of the parent's own community, the uploaded content may be forwarded to the parent (or the parent's account at the service provider), the same as any other recipient. In this, the parent may, for example, have the content downloaded to a digital video recorder (DVR), or other device or to multiple devices, at home or mobile.

Turning to the service provider 126 in more detail, it may provide components that form part of, or interface with, the various networks 108, 112, and/or 116 shown in FIG. 1. The service provider 126 may include or be implemented using a web-based portal. Illustrative components of the service provider 126 are described in detail below. In addition, the service provider 126 may provide services to the subscriber 102 and/or the recipients 118. For example, the service provider 126 may offer wireless voice and data services to the subscriber 102 and/or the recipients 118, may offer a content distribution service to the subscriber 102, and may offer broadband internet access to the subscriber 102 and/or the recipients 118. Thus, the service provider 126 may implement the links 110, 114, 122, and 124.

The service provider 126 may bundle the foregoing services into a package that is offered at set prices to the members of the communities (i.e., subscribers and/or recipients) described above. Also, the service provider 126 may supply at least some of the devices 104 and 120, and may also provide equipment for installing the wireless LAN 112 (such as wireless routers or similar equipment).

While the mobile phone network 108 and the wireless LAN 112 and broadband network 102 are shown as examples of networks that may be used for communicating content, it should be appreciated that any type of suitable network may be used.

Figure 2:
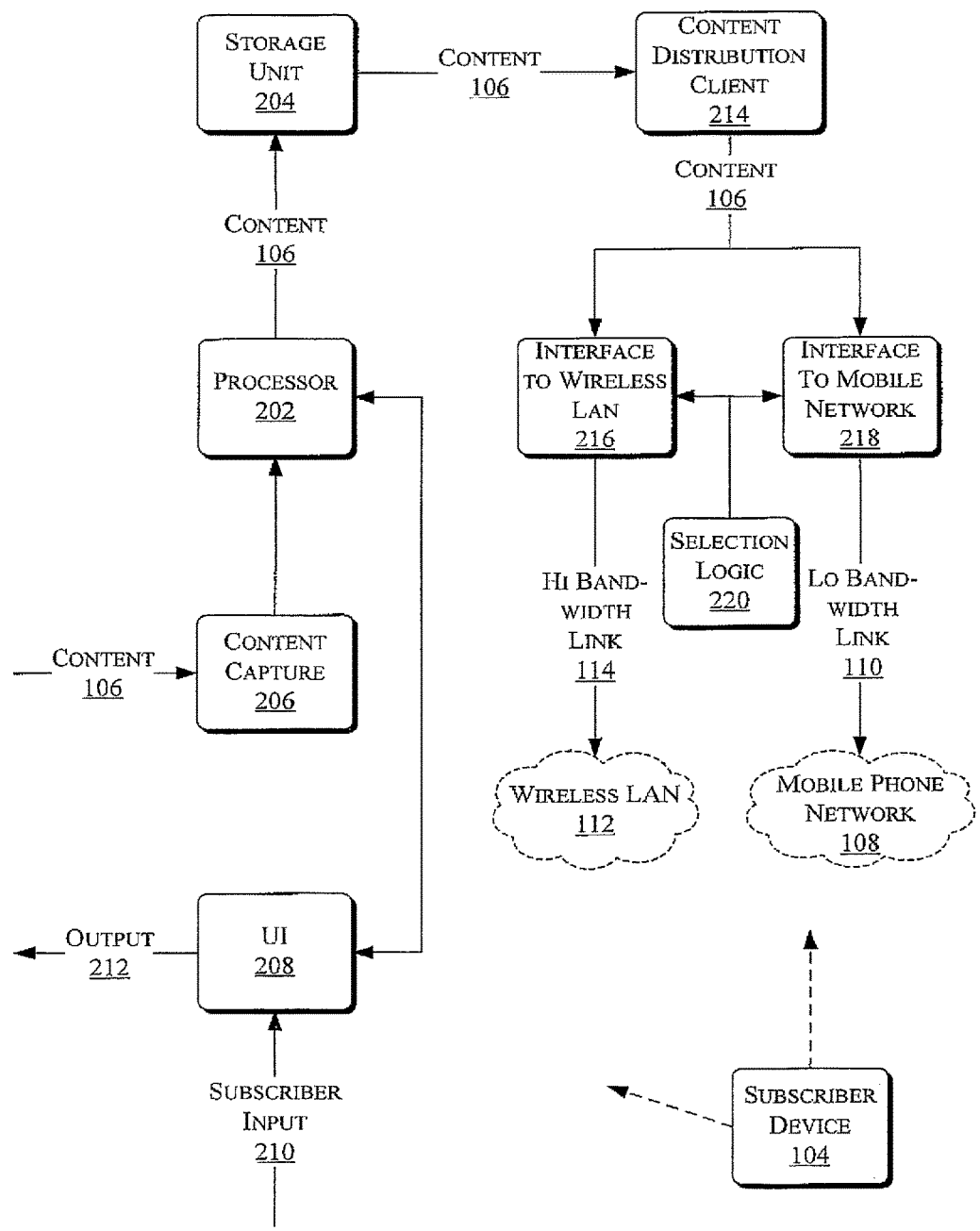
FIG. 2 is a block diagram of illustrative components of a subscriber device.

FIG. 2 illustrates example components of the subscriber device 104, as shown in FIG. 1. The subscriber device 104 may include a processor 202, which may be operative to read and execute machine-readable or computer-readable instructions to perform any of the processing that is attributed herein to the device 104. The processor 202 may read from and/or write to a storage unit or computer-readable medium 204, which may store at least a body of executable software instructions, as well as other types of data described herein. The storage unit 204 may be implemented by one or more discrete devices, including but not limited to primary storage devices in the form of any type of directly-addressable memory technology, as well as secondary storage devices in the form of any type of indirectly-addressable disk storage technology, or combinations of the foregoing.

The device 104 may also include a content capture component 206, which may include a still and/or video camera, a microphone, or other means for capturing the content 106. The content capture component 206 may capture the content 106 in analog or digital form. The content 106 may include audio, video, image, or other forms, as well as any combination of the foregoing. The content capture component 206 may be configured so as to store the content 106 in the storage unit 204. The content may pass through the processor 202 on its way to the storage unit 204, or the content may by-pass the processor 202.

The device 104 may also include a user interface (UI) 208. Generally, the UI 208 may include any components appropriate for obtaining input from the subscriber 102. Subscriber input is represented generally in FIG. 2 at 210. The UI 208 may include a keypad, keyboard, or other manual input device. The UI 208 may also include a speech or voice recognition module, which may convert verbal commands from the subscriber 102 into commands that are executable by the processor 202. These verbal commands may be captured by the content capture unit 206, or by a microphone included as part of the UI 208. Given the above description, the subscriber input 210 may include manual and/or verbal input.

The UI 208 can also include components for providing output or feedback to the subscriber 102. To provide output, the UI 208 may include one or more displays for presenting visual feedback to the subscriber 102. Finally, the UI 208 may also include one or more speakers for providing audible feedback. FIG. 2 generally represents output provided to the subscriber 102 at 212.

The device 104 may also include a content distribution client 214, which may be implemented as a body of computer program instructions that are executable by the processor 202. The content distribution client 214 may retrieve the content 106 from the storage unit 204, and upload the content from the device 104 to the service provider 126 (not shown in FIG. 2). The content may be uploaded via the mobile phone network 108 and/or the wireless LAN 112 for distribution to the recipients 120, or the subscriber may upload to the service provider by connecting their Subscriber Device 104 via a cable to a PC. Thus, the device 104 may include an interface 216 for connecting to the wireless LAN 112, and an interface 218 for connecting to the mobile phone network 108.

The interface 216 may include a network adapter compatible with, for example, the IEEE 802.11 standard or other specification applicable to the wireless LAN 112, as well as related antenna structure. The interface 218 may include an RF network adapter and related antenna structure for placing the device 104 in communication with, for example, the mobile telephone network 108. The links 114 and 110 described above may be associated, respectively, with the interfaces 216 and 218.

Selection logic 220 may be configured to select from between the mobile phone network 108 and the wireless LAN 112 when uploading the content 106. For example, the selection logic 220 may detect or sense the presence of the wireless LAN 112. The selection logic 220 may also assess the signal strength and bandwidth capacity of the wireless LAN 112. If the signal strength and bandwidth capacity of the of the wireless LAN 112 meet or exceed predefined thresholds, the selection logic may select the wireless LAN 112, and the related interface 216, for uploading the content 106.

Also, the selection logic may operate based on known pricing levels related to the mobile network 108 and/or the service provider 126. For example, the mobile network and/or the service provider may offer free data air-time during nights and weekends. In these cases, the subscriber device 104 may send the data over the mobile network 108 during such times of "free air-time". However, during times that the mobile network charges for airtime, the Selection Logic 220 in the subscriber device may be set to store the collected content, and only send it when the device is served by the wireless LAN 112.

In some instances, only the mobile phone network 108 may be available. In other instances, the mobile phone network 108 may have sufficient bandwidth capacity to upload the content 106 in a reasonable amount of time. For example, if the content 106 is audio content only, or if the content is highly-compressed or down-sampled video, then the mobile phone network 108 may be suitable for uploading this content from the device 104.

In some implementations, the mobile phone network 108 may be a third-generation (3G) network. In such implementations, the 3G network may have sufficient bandwidth to upload the content 106 quickly. If the subscriber has signed on for 3G network services, and wishes to incur the costs associated with uploading the content 106 using 3G bandwidth, then the subscriber may choose this option. Alternatively, the subscriber can upload the content using a private WiFi network.

As an operational example, recall the example introduced above in which the subscriber 102 has captured content 106 in the form of a video of a child's sporting event. When the subscriber 102 returns home afterwards, the selection logic 220 may detect the presence of a wireless LAN 112 configured in the home of the subscriber 102. Having detected the wireless LAN, the selection logic 220 may select the interface 216 for uploading the content 106, thereby using the higher bandwidth capabilities of the wireless LAN 112, as compared to the mobile phone network 108.

In some implementations, the subscriber 102 may configure the device 104 with preferences and rules specifying when to use the mobile phone network 108 and/or the wireless LAN 112, and with what types of content 106. Other examples of such rules or preferences may specify whether the content 106 is to be uploaded automatically when the wireless LAN 112 is detected, or whether the subscriber 102 is to manually initiate the uploads.

Any of the foregoing preferences and rules may be specified by default. In some implementations, these default settings may be overridden by the subscriber 102. In other implementations, these default settings are not overridden. The above preferences, rules, default setting, and the like may be specified by the subscriber using the user interface 208. In any event, these preferences and rules, whether specified by default or by the subscriber, may be implemented in the selection logic 220.

Figure 3:
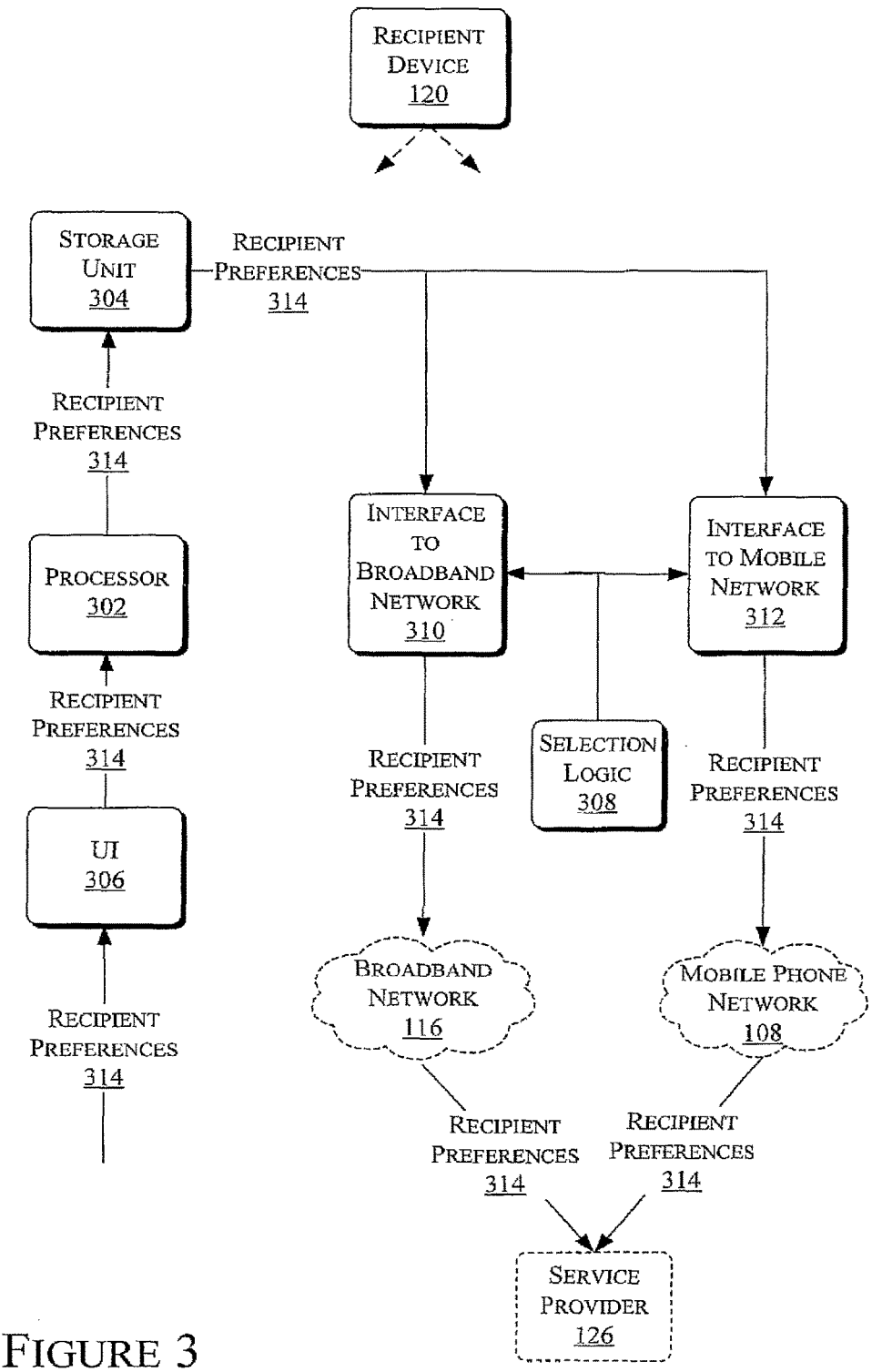
FIG. 3 is a block diagram of illustrative components of a recipient device.
Figure 4:
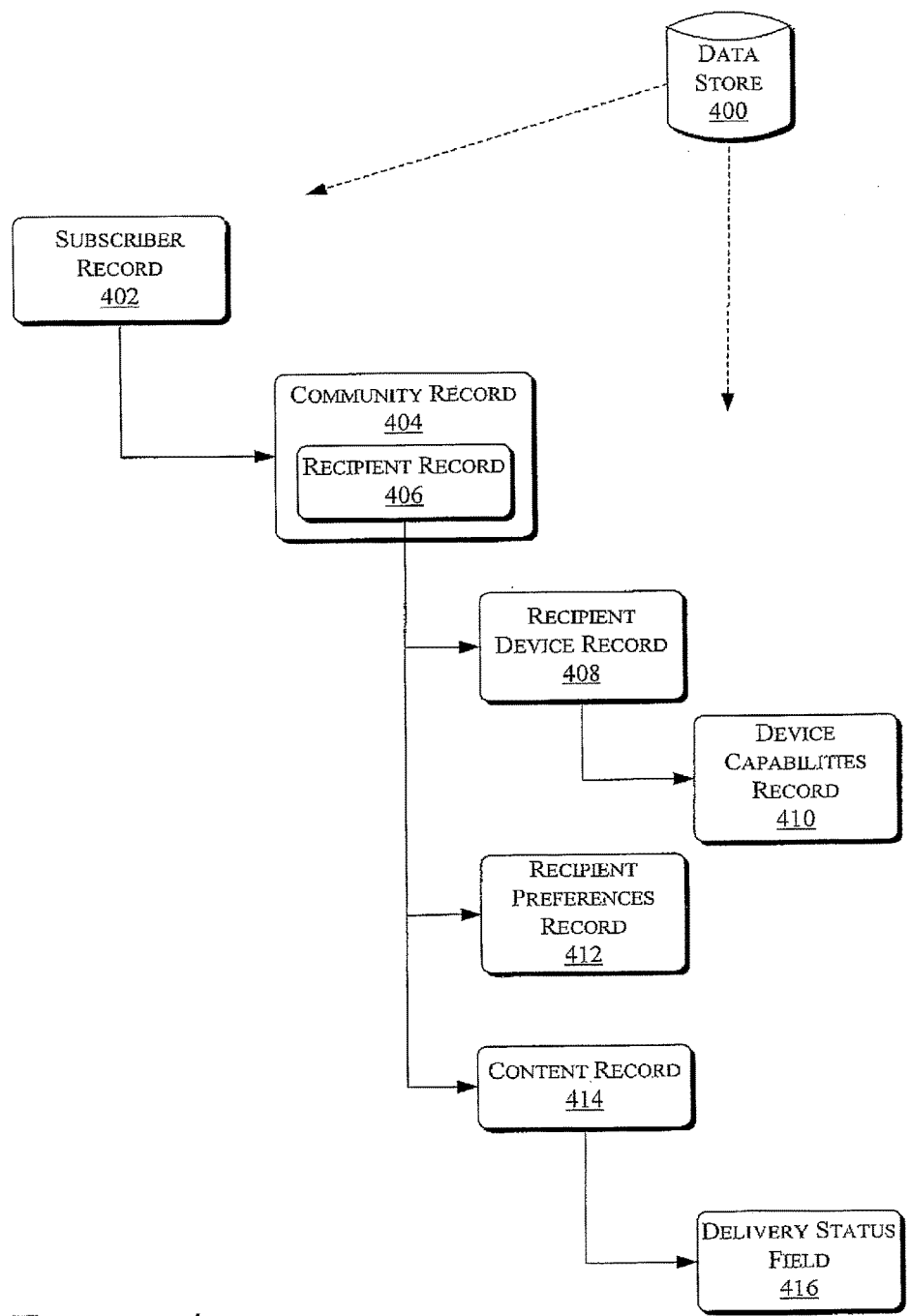
FIG. 4 is a block diagram of a data structure containing a set of records and fields for data relating to a subscriber, one or more recipients, subscriber content, and various related parameters.

Having described illustrative components and data flows for the subscriber device 104, the description now turns to a similar discussion of the recipient devices 120, presented with FIGS. 3 and 4.

FIG. 3 illustrates example components of the recipient devices 120, as shown in FIG. 1. FIG. 3 also illustrates example data flows for enabling the recipients 118 to specify preferences related to downloading the content 106.

The recipient devices 120 may include components that are similar to those described above in FIG. 2, and the description of the components in FIG. 2 is repeated for the similar components in FIG. 3. For example, the processor 302, the storage unit 304, the UI 306, and the selection logic 308 are similar to the components 202, 204, 208, and 220 illustrated in FIG. 2, and the above descriptions with regard to these components shown in FIG. 2 apply to the similar components as shown in FIG. 3.

In addition, the recipient devices 120 may include an interface 310 that couples the recipient devices 120 to the broadband network 116 shown in FIG. 1. Some devices 120, such as the device 120B shown in FIG. 1, may include an instance of an interface 312 to the mobile network 108.

FIG. 3 also illustrates a data flow that enables the recipients 118 to specify preferences related to downloading the content 106, using the recipient devices 120. Generally, these recipient preferences are referenced in FIG. 3 at 314. For example, these preferences 314 may indicate whether content 106 is to be downloaded using the interface 310 to the broadband network 116, or using the interface 312 to the mobile phone network 108. These preferences 314 may also indicate whether a given recipient 118 wishes to have the content automatically pushed from the service provider 126 to the recipient's device 120 as soon as the content is available.

As at least one alternative to the automatic push of content from a subscriber to a recipient, the recipient 118 may be notified that the content is available, and the recipient may than manually download the content when he or she so wishes. Additionally, the recipient may define rules or preferences that specify one or more of the foregoing approaches to apply in different circumstances.

These preferences may also specify that content relating only to certain specified subject matter should be downloaded. For example, a given recipient may want to receive only content that pertains to the recipient's granddaughter.

In any event, the preferences 314 may be obtained from the recipient 118 via the UI 306, and forwarded in turn to the processor 302 and the storage unit 304. The selection logic 308 may select between the interfaces 310 and 312, depending, for example, on pre-defined rules or specifications, or depending on the signal strength and network speeds of the broadband network 116 or the mobile phone network 108. The preferences 314 are then sent to the service provider 126 via the broadband network 116 or the mobile phone network 108, depending on which interface is chosen by the selection logic 308. Additionally, the recipients themselves may determine or specify rules or preferences for which network to use, similarly to how the subscriber specified network preferences as described above.

Having described illustrative components of the subscriber and recipient devices, the discussion now turns to a description of a data structure that may be populated using these devices.

FIG. 4 illustrates a data structure for a distribution scheme for subscriber-created content. The data structure includes a set of records and fields representing the subscriber 102, the recipient(s) 118, the content 106, and various parameters related to the foregoing. The records and fields may be implemented in a data structure or data store 400 that is populated with data as the processing shown in FIGS. 1-3 is executed. The data store 400 may be maintained, at least in part, by a service provider. An example of a service provider is shown in FIG. 1 at 126.

The data store 400 may include a record 402 containing data relating to a subscriber 102. The subscriber record 402 may be associated with a community record 404, which in turn may include one or more recipient records 406. The subscriber may define one or more communities, and may specify one or more recipients as members of such communities. For example, but not limitation, a subscriber might define one community for distributing work-related content to co-workers, and might define another community for distributing personal content to family and friends. Each defined community may be represented by a respective community record 404, and each member within the communities may be represented by a respective recipient record 406. Each content may be represented as a content type (e.g. personal content, family content, work content, friend content) and designated as such in Data Store 400.

It is noted that recipients 118 may be members of multiple communities. Further, these multiple communities may be associated with one or more subscribers 102. Additionally, a subscriber as to one community may be a recipient as to another community, and vice versa. Finally, a subscriber may also be a recipient within his or her own community.

Each recipient record 406 may point to or otherwise be associated with one or more recipient device records 408. Each recipient may use one or more devices 120 to receive content 106, and the recipient record 406 may include a respective device record 408 for each such device.

Each device record 408 may point to or otherwise be associated with a record 410 that stores capabilities associated with the respective recipient devices 120. These capabilities are stored in the records 410 for later reference when delivering content to the recipients via the recipient devices 120. Examples of device capabilities may include screen sizes and resolutions, media player capability, configurations of features or equipment provided by the device, signal throughput rates, storage capacities, network compatibility data, or the like.

The recipients 118 may populate the records 410, e.g., manually, when the recipients are invited to become members of a subscriber's community. Alternatively, these records 410 may be retrieved or populated from a pre-existing data store, using an identifier for a given recipient device 120 as a key. For example, such a data store may include a library that contains device capability data. This library may be queried on demand to discover the capabilities of a given make and model of device.

The recipient record 406 may also point to one or more records 412 that contain preferences or rules. These preferences or rules may govern how and/or when the content 106 is to be delivered to the recipient 118 corresponding to the record 406. For example, a recipient may specify that the content is to be delivered to a first device (e.g., device 120A shown in FIG. 1) under certain conditions, and is to be delivered to a second device (e.g., device 120B shown in FIG. 1) under other conditions. These rules may also be content-specific, with certain content being acceptable and other content being rejected. These rules may be specified in whole or in part by the recipients, or may be specified by default for one or more recipients.

The community record 404 may point to one or more records 414 for storing the content 106 uploaded by the subscriber 102. As described in more detail below, when the subscriber uploads content 106 to the service provider 126, the content is eventually forwarded to all recipients who are members of the subscriber's community. While the implementation shown in FIG. 4 illustrates one recipient in the subscriber's community, it is understood that the subscriber's community could contain any number of recipients. Additionally, if the subscriber has defined more than one community, the subscriber may specify which community is to receive the content.

While FIG. 2 shows one instance of the content 106, it is noted that a given subscriber may upload multiple instances of the content for delivery to one or more different communities. Accordingly, the subscriber record 402 may contain a respective content record 414 for each instance of content uploaded by the subscriber. To avoid storing duplicate instances of the content, the content may be stored once, and the content record 414 may include a pointer or reference to where the content has been stored.

Each instance of the content record 414 may be associated with one or more delivery status fields 416. These status fields 416 may indicate whether a given instance of content has been delivered to a given recipient. The status fields 416 may be implemented using flag, binary, Boolean, or other similar variables. One status field 416 is shown in FIG. 4 only for clarity of illustration, but it is noted that any number of status fields 416 may be included in various implementations, depending on how many recipients are to receive a given instance of content.

In some possible implementations, the status field 416 may indicate that a given instance of content has been partially streamed or otherwise delivered to a given recipient. For example, a given recipient may begin downloading a given instance of content, but afterwards, for any number of reasons, the download may be terminated. The recipient may affirmatively terminate the download, or a device or network failure may terminate the download. In any event, the recipient may wish to resume the download sometime later, and not have to restart the entire download.

To support this type of a resume function in such circumstances, the status field 416 may store, for example, what percentage of the content has been downloaded or delivered, or what percentage remains to be downloaded or delivered. In such instances, the status field 416 may be implemented as an integer or float data type, or other convenient data type.

As an example of this resume function, the service provider 126 may enable a given recipient to begin receiving a stream at home on a desktop computer. However, if the recipient must leave home during the stream, the recipient may terminate the stream sent to his or her desktop, and resume receiving the stream on, for example, a mobile phone. Thus, the service provider may enable the recipients to "see what the subscriber sees", even if the recipients change devices mid-stream.

As an example of delivering content to recipients of a given community, assume that a given subscriber has defined a community having three recipients Mo, Larry, and Curley. In this example, the subscriber record 402 would be associated with one instance of the community record 404. In turn, this one community record 404 would be associated with three instances of the recipient records 406, one each for the three recipients Mo, Larry, and Curley.

Assume further that the given subscriber has uploaded two instances of content, referenced as A and B. In this example, Mo, Larry, and Curley would each have a corresponding recipient record 406. The recipient records 406 for Mo, Larry, and Curley would each be associated with two instances of the content record 414: one content record 414 for the content A, and one content record 414 for the content B. Each content record 414 for content A would include a respective status field 416, indicating whether content A has been delivered to the corresponding recipient on the recipient's designated device or devices. Each recipient may designate specific devices for receiving the content. Thus, each content record 414 defined for the content B would include a respective status field 416, indicating whether content B has been delivered to the corresponding device(s) of the recipient. In this example, the subscriber record 402 would contain a total of six status fields 416, each indicating whether the content A and B has been delivered to the device(s) of the recipients Mo, Larry, and Curley.

When the subscriber uploads, for example, the content A, the three status fields 416 are created for the recipients Mo, Larry, and Curley. Since the content A was just uploaded, these new status fields 416 may be initialized to a "no" or logical-zero value. However, as the content A is delivered to the recipients X, Y, and Z over time, the values in the status fields 416 for these recipients may be updated to a "yes" or logical-one value. Alternatively, the status fields 416 may be updated to show what percentage of the content has been delivered, or is yet to be delivered.

Figure 5:
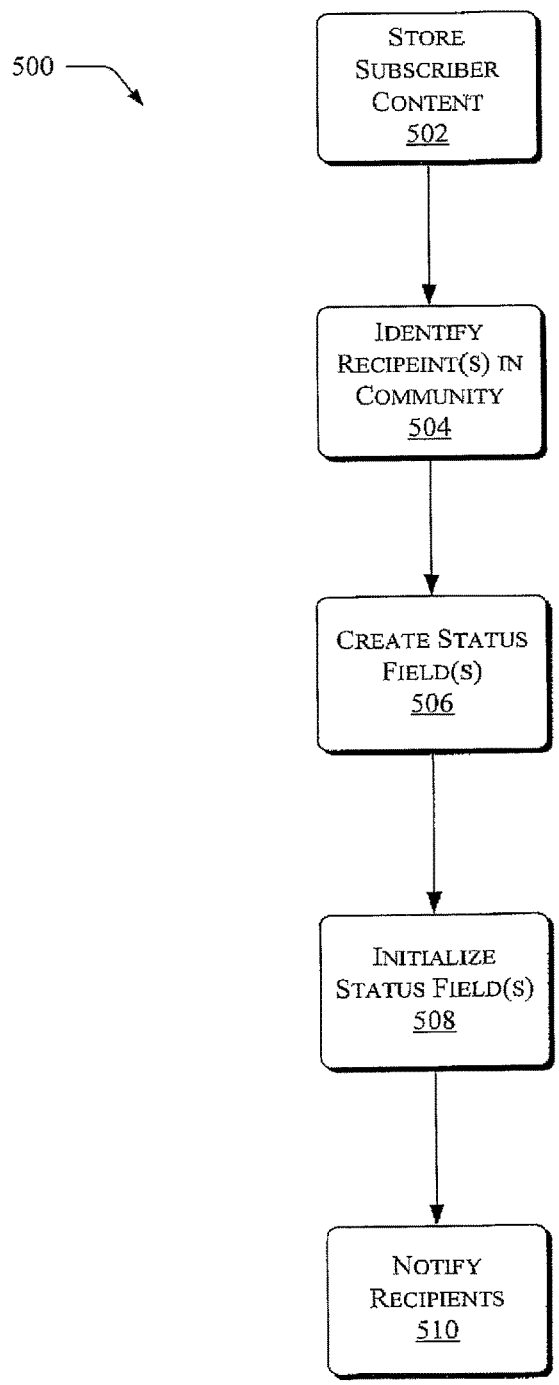
FIG. 5 is a flow diagram of a process for uploading content from the subscribers.

Having described the data structure in FIG. 4, the discussion now turns to a process flow suitable for uploading content from the subscribers, now presented with FIG. 5.

FIG. 5 illustrates a process flow 500 for uploading content from the subscribers. The process flow 500 may be performed by, for example, the service provider 126 shown in FIG. 1. However, at least some of the process flow 500 may be performed using other components without departing from the spirit and scope of the description herein.

Action block 502 represents storing the content uploaded by the subscriber. For example, as discussed in FIG. 4, subscriber content 106 may be stored into a content record 414 within the data store 400. In implementations where a subscriber has defined more than one community of recipients, block 502 may include enabling the subscriber to designate which community or communities should receive the uploaded content.

Action block 504 represents identifying the one or more recipients who are members of the community to which the uploaded content should be distributed. For example, as discussed in FIG. 4, the data store 400 may associate one or more community records 404 with each subscriber record 402. the data store 400 may also associate each community record 404 with a recipient record 406 for each member in the subscriber's community.

When content is uploaded by the subscriber, block 504 may include accessing a data store, such as the data store 400. Block 504 may also include locating all recipient records 406 associated with the community record 404 to which the content is to be delivered.

Action block 506 represents creating a field for storing a delivery status of the uploaded content. A respective status delivery field may be created for each device designated to receive content by the recipient who is in the subscriber community that is to receive the uploaded content. An example of a status delivery field is shown in FIG. 4 at 416.

Action block 508 represents initializing the status delivery fields for each device designated to receive content by the recipient to a "no" or zero value when created, to indicate that the uploaded content has not yet been delivered to the recipients' devices. However, as the content is delivered to the recipients' devices, the corresponding status delivery fields may be updated to reflect delivery status.

Action block 510 represents notifying the recipients identified in block 504 that the uploaded content is available. In different implementations, the content may be pushed to the recipients automatically when the recipients are in communication with, for example, the service provider 126. In other implementations, the recipients may act affirmatively to receive the uploaded content.

Figure 6:
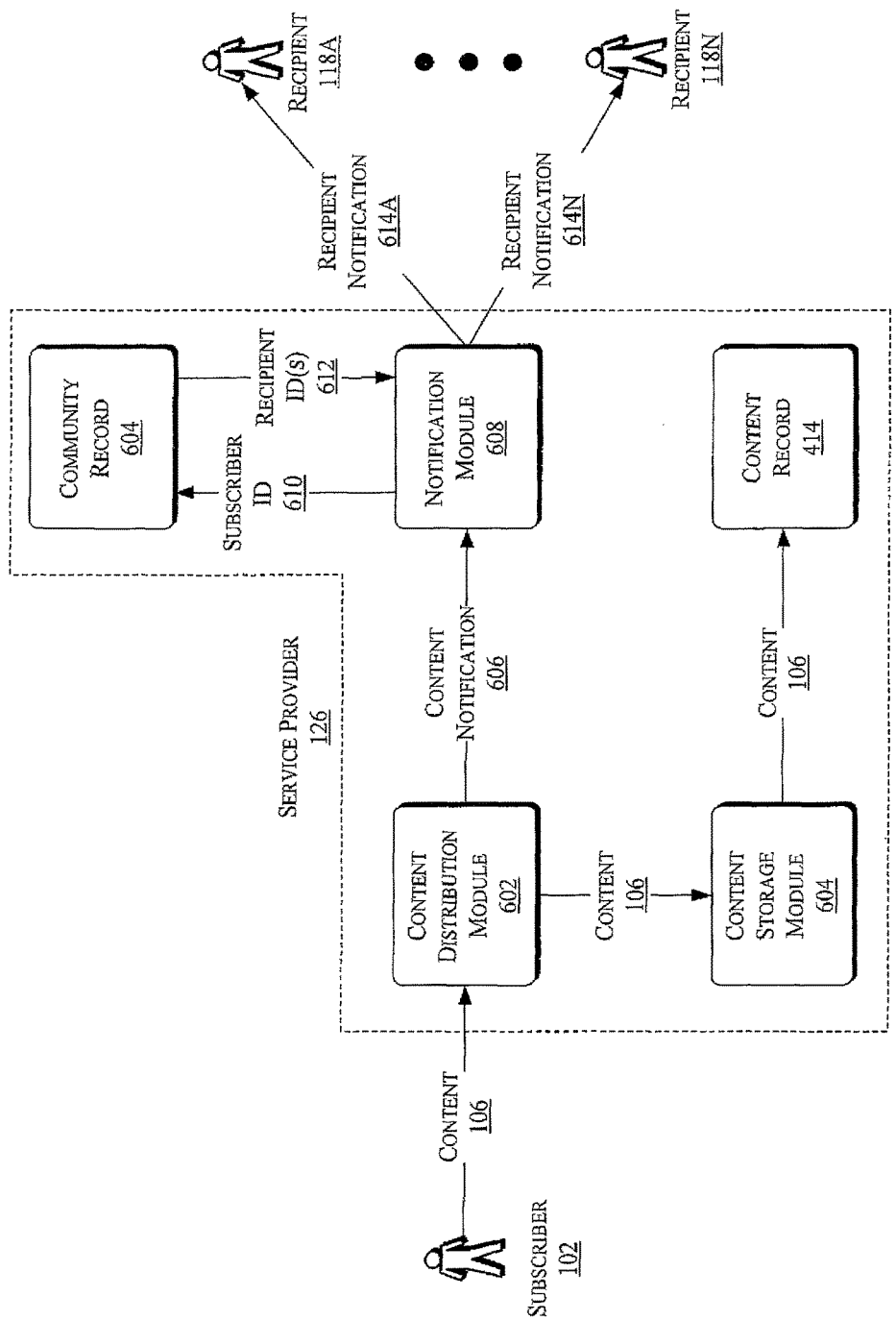
FIG. 6 is a block diagram of illustrative components of a service provider, suitable for uploading subscriber-created content.

Having described the process flow for uploading content from the subscribers, the discussion now turns to a description of components of the service provider that are suitable for uploading the subscriber-created content, now presented with FIG. 6.

FIG. 6 illustrates example components that may be included in a service provider for uploading subscriber-created content. An example service provider is shown in FIG. 1 at 126, and for convenience, FIG. 6 includes a dashed-line representation of the service provider 126. More particularly, FIG. 6 shows components and data flows related to uploading the subscriber-created content.

In the illustrated implementation, a subscriber 102 may upload content 106 to a content distribution module 602 to begin the process of distributing the content to the recipients 118. As noted above, when the subscriber has defined more than one community, the subscriber may indicate which community is to receive the uploaded content.

Having received the uploaded content 106, the content distribution module 602 forwards the content to a content storage module 604. The content storage module 604 may store the content for later retrieval by members of the community to which the subscriber chooses to send the content. For example, the content storage module may create a record such as the content record 414, as discussed in FIG. 4, and store the uploaded content into this record.

Returning to the content distribution module 602, after receiving the uploaded content, the content distribution module creates a content notification 606. The content notification may include at least a name or other unique identifier associated with the subscriber. In instances where the subscriber has created more than one community, the content notification may also include an identifier for the community for which the uploaded content is intended. Where the subscriber has only one community, the community identifier (ID) may be somewhat redundant, and may be omitted.

The content distribution module 602 forwards the content notification 606 to a notification module 608. The notification module may extract the subscriber ID, referenced at 610, from the content notification. Where the subscriber has designated a community, the notification module may extract a community ID from the content notification. Using the subscriber ID, the notification module may locate all recipients who are in the subscriber's community. For example, the notification module may query a data store, such as the data store 400, using the subscriber ID (and/or the community ID) as a search key. Thus, the data store may return all recipient records 406 that are associated with the subscriber ID and/or the community ID. The recipient records may include the device identifiers for which each recipient designates to receive the content.

Having located the recipients who are to receive the uploaded content, the notification module 608 may create and send appropriate notifications to one or more devices 120 of the recipients 118. FIG. 6 shows two recipients 118A and 118N for convenience only, and the respective notifications to each are referenced at 614A and 614N (collectively, notifications 614). However, it is noted that the number of recipients and notifications may vary depending on how many members are in the subscriber's community.

Having described process flows and components related to uploading the subscriber content, the discussion now turns to process flows and component for distributing the subscriber content to recipients. Process flows are presented in FIG. 7, and components are presented in FIG. 8.

Figure 7:
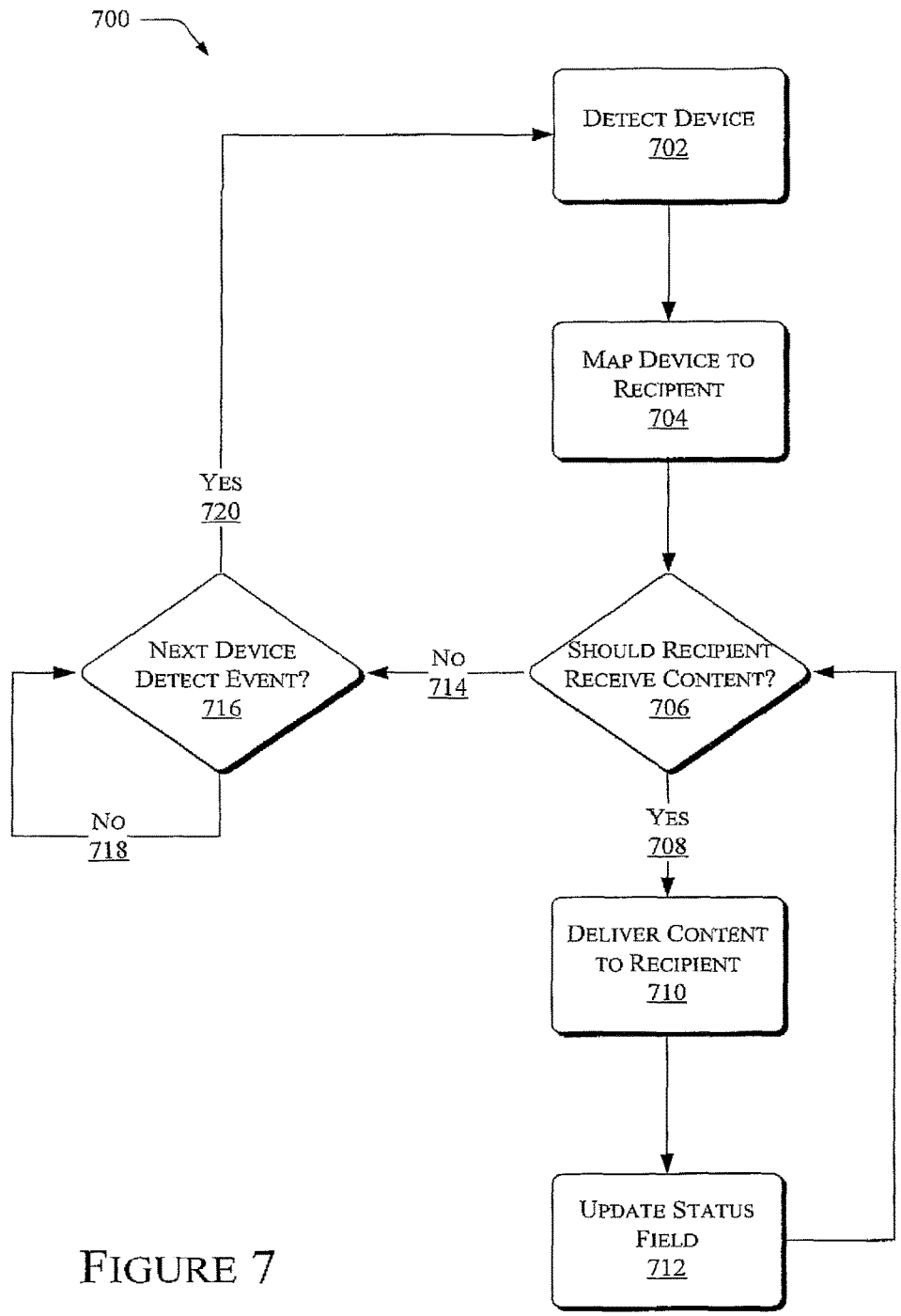
FIG. 7 is a flow diagram of a process for delivering content to a recipient.

FIG. 7 illustrates a process flow 700 for delivering subscriber content to one or more devices of the recipients. In but one possible implementation, at least some of the process flow 700 may be performed by a service provider, such as the service provider 126 illustrated and described herein. However, at least part of the process flow 700 may be performed using other components without departing from the spirit and scope of the description herein.

Action block 702 represents detecting a device associated with a recipient. Examples of recipient devices are shown in FIG. 1 at 120, and example recipients are shown at 118. Block 702 may represent, for example, a mobile telephone network (e.g., the network 108 in FIG. 1) detecting any recipient devices within the network's coverage area, and signing such devices into the network.

Block 702 may also represent a wireless LAN (e.g., the wireless LAN 112 in FIG. 1) sensing the presence of the recipient devices, and establishing communication with these recipient devices. For example, if a given recipient has deployed a wireless router or a similar device in his or her home, and if the recipient device is brought within the range of the wireless router, then block 702 may represent the wireless router establishing communication with the recipient device.

Block 702 may include obtaining a unique identifier associated with the recipient device(s). Examples of such unique identifiers may include a mobile identification number (MIN), an electronic serial number (ESN), an IP address, or the like.

Action block 704 represents mapping the recipient device (s) to a recipient as appropriate to facilitate searching records maintained by, for example, the service provider

126. Block 704 may include querying one or more data stores, using as a key the unique identifier obtained in block 702. Block 704 determines the identity of the recipient, if the identity is not already apparent from the unique identifier obtained in block 702. For example, if the records maintained by the service provider 126 are indexed by the unique identifier obtained in block 702, then block 704 may be omitted.

Block 706 represents testing whether the recipient is due to receive content. Block 706 may include querying a data store, such as the data store 400 shown in FIG. 4, using the identifier obtained in blocks 702 and/or 704 as a search key. If the data store contains recipient records 406 that match the search key, then block 706 can also include searching for any content records 414 that are due to be delivered to the recipients' devices. More particularly, block 706 may include searching for any delivery status fields 416 having a value that indicates that the corresponding content should be delivered to the recipient. Assuming that the delivery status fields 416 are implemented as logical variables, or equivalents thereof, block 706 may include testing these logical variables.

From block 706, if the recipient is due to receive content, then the process flow 700 takes branch 708 to block 710. Block 710 represents delivering the content to the recipient. Depending on the nature of the connection established with the recipient, the content may be delivered via, for example, a mobile telephone network 108, a wireless LAN 112, or any other suitable network.

Block 712 represents updating the status field associated with particular content delivered to the device(s) associated with a recipient. For example, if the content is fully delivered or distributed to the device of a recipient, block 712 may include marking the content as having been completely delivered to the recipient's device. If the content is partially delivered, then block 712 may include updating the status field to indicate how much content was delivered, or how much content remains to be delivered. In but one possible implementation, block 712 may include updating a record, such as the delivery status field 416, to indicate that the corresponding content has been delivered to the designated device(s) of the recipient. In this manner, the same content will not be re-delivered to the recipient the next time that the recipient's device is detected.

The process flow 700 may return to block 706 to test whether any additional content is to be delivered to the recipient. If so, branch 708 is taken again, and blocks 710 and 712 are repeated, until no more content remains to be delivered to the recipient.

From block 706, if no content is to be delivered to the recipient, then the process flow takes branch 714 to block 716. Branch 714 may be taken if, for example, no recipient records 406 are associated with content records 414 whose delivery status fields 416 indicate that the content has not yet been delivered to the recipient.

Block 716 loops to itself via branch 718 until the next recipient device is detected. When the next device detection event occurs, the process flow 700 takes branch 720 to block 702, and the above-described processing is performed with the newly-detected recipient device.

Having described a process flow for delivering the subscriber content to the recipients, the discussion now turns to a description of service provider components suitable for delivering the subscriber content to the recipients.

Figure 8:
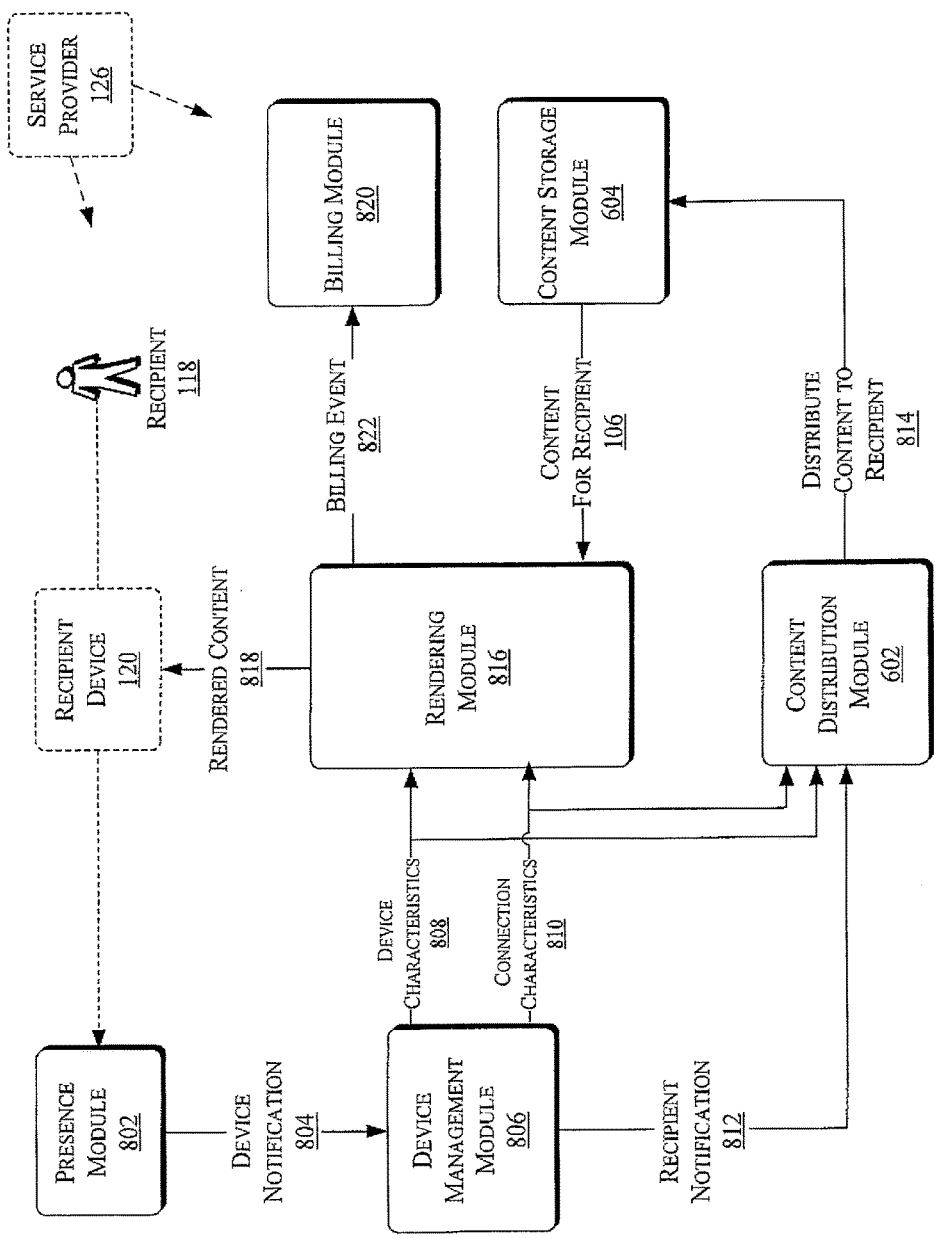
FIG. 8 is a block diagram of illustrative components of the service provider, suitable for delivering the subscriber content to the recipients.

FIG. 8 illustrates components of a service provider that may be suitable for delivering the subscriber content to one or more recipients. An example of the service provider is denoted at 126 in FIG. 1. For convenience only, the service provider 126 is carried forward to FIG. 8, and shown in dashed outline. An example recipient is denoted at 118, and an example recipient device is shown at 120.

The service provider 126 may include a presence module 802 that is operative to detect when the recipient device 120 is active on a network. Put differently, the presence module 802 detects any recipient devices 120 within communication range, and establishes communication therewith. The presence module may be compatible with, for example, the mobile telephone network 108, the wireless LAN 112, and/or any other suitable communications network.

Once the presence module 802 has detected and established communication with the recipient device 120, the presence module outputs a device notification 804. The device notification 804 may indicate a type of the recipient device, such as a make/model parameter of the recipient device, mobile identification number (MIN), an electronic serial number (ESN), or other identifier associated with the device. The device notification 804 may also convey characteristics of the connection with the device, such as network type, connection speeds, or the like.

A device management module 806 receives the device notification 804. Based on the device identifier included in the device notification, the device management module may query, for example, the data store 400 to obtain the features or characteristics of the particular device. These features may include attributes such as display size, color range, display resolution, storage capacity, media player capability, data throughput capability, processor power, or the like. These device characteristics are denoted generally at 808, which represents a line, a signal, or a data element that transmits these device features.

The device management module may also output connection characteristics 810, which indicate features of the connection between the device 120 and the service provider 126. For example, the connection characteristics 810 may indicate whether the service provider 126 is communicating with the device 120 over a relatively high-bandwidth network link (e.g., a wireless LAN link) or a relatively low-bandwidth network link (e.g., an RF link). The reference 810 represents a line, a signal, or a data element that transmits these connection characteristics.

In some implementations, the device management module may map the recipient devices 120 to a particular recipient 118. For example, certain data stores may be indexed by a recipient identifier, rather than a device identifier. In such instances, it may be appropriate to map the device identifier to a corresponding recipient identifier, in order to search these data stores efficiently. In such implementations, the device management module may output a recipient notification 812. A recipient may have multiple devices and device types.

The content distribution module 602, carried forward from FIG. 6, maintains a set of rules and/or conditions that define how and/or when content is distributed to various recipients 118. The process of enabling the recipients to specify preferences for receiving the content is described above. The rules and conditions stored in the content distribution module may reflect these recipient preferences.

The content distribution module 602 may receive the device characteristics 808, the connection characteristics 810, and in some implementations, the recipient notification 812. Taken collectively, these inputs 808, 810, and 812 indicate an environment in which the service provider 126 may communicate with the device 120 and/or the recipient 118. Based on these inputs, the content distribution module may determine whether this environment satisfies the preferences expressed previously by the recipient. If the environment prevailing at a given time satisfies the recipient's stated preferences, then the content distribution module may output a command 814 to distribute content to the recipient.

A content storage module 604, carried forward from FIG. 6, may receive the command 814 to distribute content to a given recipient. The content storage module 604 associates subscribers 102 with respective communities of recipients and their devices, and stores content uploaded by different subscribers. The content storage module may be organized in accordance with data structure, such as that shown in the data store 400 from FIG. 4.

The content storage module 604 may be responsive to the command 814 to search its data store or stores for any content that is due to be delivered to the recipient 118. If any such content is due for delivery, then the content storage module may output this content for delivery to the given recipient. This content is denoted in FIG. 8 at 106.

A rendering module 816 may receive the content 106 for distribution to the recipient 118. The content 106 may, for example, take the form of high-quality audio and/or video content. The rendering module 816 also receives device characteristics 808 and connection characteristics 810. Based on the device characteristics and the connection characteristics, the rendering module may adjust the rendering of the content 106. For example, the rendering module may down-sample the content as transmitted to the recipient, in light of the capabilities of the device 120 or the connection to the device.

Put differently, the rendering module may tailor the content 106 for the particular capabilities of a given device or network connection. Additionally, the rendering module may separately sample and render audio and video components of a given instance of content, as appropriate for device or network capabilities. The content as rendered for delivery to the recipient device is denoted at 818.

A billing module 820 may implement several different billing options for the subscribers who upload content and for the recipients who receive the content. One option may include the subscriber paying entirely for the content distribution services, with the recipients bearing no cost for the services. The subscriber and the recipients may also share the cost of the services.

The billing module 820 may bill services on a flat rate per unit time. For example, services may be billed on a monthly basis, whether charged to the subscriber or the recipients. Payment of this flat rate may entitle the subscriber and/or the recipients to upload or download some set amount of content, or to or download unlimited content.

In some instances, the billing module 820 may bill the subscriber based on how much content the subscriber uploads to the service, or how much content the recipients download from the service. In other instances, the recipient may be billed based on how much content he or she receives from the service or the type of content. Depending on the billing structure in place, the recipients may alter their delivery preferences accordingly.

As shown in FIG. 8, some implementations of the billing module 820 may receive an event signal 822 from the rendering module 816 that indicates when content has been delivered to a given recipient device 120. This signal 820 may be an input to the billing process, and may serve as a trigger to store billing-related information associated with the subscriber and/or the recipient.

In some implementations, the content 106 distributed by the service provider 126 may be distributed without incurring any type of license fees. This model may be appropriate when the content is of a personal, non-professional nature. Examples of such content may include recordings of family events, functions, or the like.

In other implementations, the content may be of a more professional nature, such that its distribution incurs license fees. Examples of such professional content may include music produced by the subscriber, professional photography or video shot by the subscriber, or any other types of audio and/or video content that are created and distributed for profit. In these latter implementations, the billing module 820 may support billing and settlement of license fees arising from distribution of licensed content.

It is noted that the various modules shown in FIG. 8 may be implemented in hardware, software, or any combination thereof. Additionally, these modules are shown as separate items only for convenience of reference and description, and these representations do not limit possible implementations of the teachings herein. Instead, various functions described with these modules could be combined or separated as appropriate in a given implementation, without departing from the scope and spirit of the description herein.

CONCLUSION

Although techniques for providing a distribution scheme for subscriber-related content have been described in language specific to certain features and methods, it is to be understood that the features defined in the appended claims are not necessarily limited to the specific features and methods described. Rather, the specific features and methods are disclosed as illustrative forms of implementing the claimed subject matter.

The invention claimed is:

1. A computer-implemented method comprising:
receiving, by at least one hardware component of a service provider network, a content from a subscriber who created the content, wherein the service provider network provides a broadband internet access to the subscriber and wherein the at least one hardware component of the service provider network is distinct from a device of the subscriber and is distinct from a device of a recipient;
identifying, by the at least one hardware component of the service provider network, the recipient in a community associated with the subscriber, wherein the recipient has joined the community in response to an invitation extended by the subscriber;
storing, by the at least one hardware component of the service provider network, the content in the service provider network while waiting for the device of the recipient to connect to the service provider network;
detecting, by the at least one hardware component, the device of the recipient is connected to the service provider network;
delivering, by the at least one hardware component of the service provider network, the content to the recipient; and
generating, by the at least one hardware component of the service provider network, a billing event in response to the content that is delivered to the recipient.

2. The computer-implemented method of claim 1, further comprising creating status data associated with the content and with the recipient, wherein the status data indicates a status of a delivery of the content to the device of the recipient.

3. The computer-implemented method of claim 2, further comprising initializing the status data to indicate that the content is awaiting delivery to the recipient.

4. The computer-implemented method of claim 2, further comprising updating the status data to indicate that the content has been partially delivered to the recipient.

5. The computer-implemented method of claim 2, further comprising updating the status data to indicate that the content has been fully delivered to the recipient.

6. The computer-implemented method of claim 1, further comprising identifying a further recipient in the community.

7. The computer-implemented method of claim 6, further comprising creating further status data associated with the content and with the further recipient, wherein the further status data indicates a status of a delivery of the content to the further recipient.

8. The computer-implemented method of claim 1, further comprising notifying the recipient that the content is available.

9. The computer-implemented method of claim 1, wherein the receiving the content includes receiving the content captured by the subscriber using a first device, and further comprising delivering the content to a second device associated with the subscriber.

10. A computer-implemented method comprising:
   detecting, by at least one hardware component of a service provider network, a connection to a device of a recipient in a community associated with a subscriber, wherein the recipient has joined the community in response to an invitation extended by the subscriber, wherein the service provider network provides a broadband internet access to the subscriber and wherein the at least one hardware component of the service provider network is distinct from a device of the subscriber and is distinct from the device of the recipient;
   evaluating, by the at least one hardware component of the service provider network, whether a content created and uploaded by the subscriber is available for delivery to the recipient, wherein the service provider network stores the content while waiting for the device of the recipient to connect to the service provider network;
   delivering, by the at least one hardware component of the service provider network, the content to the recipient; and
   generating, by the at least one hardware component of the service provider network, a billing event in response to the content that is delivered to the recipient.

11. The computer-implemented method of claim 10, further comprising mapping an identifier that is associated with the device of the recipient to the recipient.

12. The computer-implemented method of claim 10, wherein the evaluating whether the content uploaded by the subscriber is available includes analyzing a status field associated with the content and the recipient.

13. The computer-implemented method of claim 10, further comprising enabling the recipient to designate the device of the recipient for receiving the content as delivered to the recipient.

14. The computer-implemented method of claim 13, wherein the delivering the content to the recipient includes delivering the content to the device of the recipient in accordance with a preference specified by the recipient.

15. The computer-implemented method of claim 10, wherein the delivering the content to the recipient includes automatically pushing the content to the device of the recipient in response to the detecting the connection to the device of the recipient.

16. The computer-implemented method of claim 10, wherein the delivering the content to the recipient includes streaming the content to the device of the recipient.

17. A system comprising:
   a service provider network comprising:
      a content distribution module for receiving content created and uploaded by a subscriber and for providing a content notification in response to receiving the content, wherein the content distribution module is implemented in hardware;
      a content storage module for storing the content into a content record, wherein the content storage module stores the content while waiting for a device of a recipient to connect to the service provider network;
      a notification module for receiving the content notification and, in response thereto, notifying the recipient that the content is available when the device of the recipient is detected as being connected to the service provider network, wherein the recipient is a member of a community that is associated with the subscriber, wherein the recipient has joined the community in response to an invitation extended by the subscriber, wherein the service provider network provides a broadband internet access to the subscriber and wherein the content distribution module of the service provider network is distinct from a device of the subscriber and is distinct from the device of the recipient; and
      a billing module for generating a billing event in response to a distribution of the content to the recipient.

18. The system of claim 17, wherein the notification module is for associating the recipient with the subscriber based on an identifier associated with the subscriber.

19. The system of claim 17, wherein the notification module is for associating a plurality of recipients with the subscriber based on an identifier associated with the subscriber.

20. The system of claim 17, wherein the notification module is for accessing a community record with an identifier associated with the subscriber, and for obtaining an identifier for the recipient.

* * * * *